United States Patent
Chen et al.

(10) Patent No.: US 7,382,877 B2
(45) Date of Patent: *Jun. 3, 2008

(54) RSA CRYPTOGRAPHIC METHOD AND SYSTEM

(75) Inventors: Liqun Chen, Bradley Stoke (GB); Keith Alexander Harrison, Woodcroft Chepstow (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 786 days.

This patent is subject to a terminal disclaimer.

(21) Appl. No.: 10/866,053

(22) Filed: Jun. 10, 2004

(65) Prior Publication Data

US 2005/0002528 A1    Jan. 6, 2005

(30) Foreign Application Priority Data

Jun. 13, 2003    (GB) ................... 0313666.0

(51) Int. Cl.
*H04L 9/30*    (2006.01)
*H04K 1/00*    (2006.01)

(52) U.S. Cl. ...................... 380/30; 713/180
(58) Field of Classification Search .................. 380/30; 713/180
See application file for complete search history.

(56) References Cited

U.S. PATENT DOCUMENTS

| 6,275,936 | B1 | 8/2001 | Kyojima et al. | |
| 2002/0103999 | A1* | 8/2002 | Camnisch et al. | ........ 713/155 |
| 2003/0095661 | A1 | 5/2003 | Harrison | ............ 380/231 |
| 2004/0151310 | A1* | 8/2004 | Fu et al. | ............ 380/44 |
| 2004/0252830 | A1* | 12/2004 | Chen et al. | ............ 380/30 |

FOREIGN PATENT DOCUMENTS

| GB | 2 384 406 A | 7/2003 |
| GB | 2 395 872 A | 6/2004 |
| WO | WO 03/017559 A2 | 2/2003 |

OTHER PUBLICATIONS

Cramer et al., "Signature Schemes Based on the Strong RSA Assumption," 2000.*
Tanaka, "Identity-Based Non-Interactive Key Sharing Equivalent to RSA Public-Key Cryptosystem," 1998.*
Bellare, M., and P. Rogaway, "Optimal Asymmetric Encryption—How to Encrypt with RSA," *Advances in Cryptology—Eurocrypt '94*, pp. 92-111, Springer-Verlag (1994).
Boneh, D. and M. Franklin, "Identity-Based Encryption from the Weil Pairing," *Advances in Cryptology—CRYPTO 2001*, LNCS 2139, pp. 213-229, Springer-Verlag (2001).

(Continued)

*Primary Examiner*—Matthew Heneghan (57) ABSTRACT

An RSA cryptographic method and system is provided in which a sender encrypts a message (m) using a public modulus n, and an encryption exponent e that is a function of a sender-chosen string. This function is such that the values of e generated by it will not be coprime. In a preferred embodiment, a recipient receives the encrypted message and subjects it to a modulo-n blinding operation. The resultant blinded encrypted message is then made available to a trusted authority which decrypts it using a decryption exponent d based on the sender-chosen string and private data associated with the public modulus; however, the blinding applied to the message prevents the trusted authority from reading the message. The decrypted, but still blinded, message is passed back to the recipient who cancels the blinding to recover the message.

20 Claims, 3 Drawing Sheets

OTHER PUBLICATIONS

Boneh, D., et al., "Identity-Based Mediated RSA," *3rd Workshop on Information Security Application*, Jeju Island, Korea, 12 pages (Aug. 2002).

Chaum, D., "Blind Signatures for Untraceable Payments," *Advances in Cryptology—Crypto '82*, pp. 199-203, (1998), retrieved from Internet at: http://dsns.csie.netu.edu.tw/research/crypto/HTML/PDF/C82/199.PDF.

Cocks, C., "An Identity Based Encryption Scheme Based on Quadratic Residues," *Proceedings of the 8th IMA International Conference on Cryptography and Coding*, LNCS 2260, pp. 360-363, Springer-Verlag (2001).

Mohammed, E., et al., "A Blind Signature Scheme Based on ElGamal Signature," *Eurocomm 2000, Information Systems for Enhanced Public Safety and Security*, IEEE/AFCEA, pp. 51-53 (May 17, 2000).

U.S. Appl. No. 11/150,623, filed Jun. 10, 2005, Harrison et al.

U.S. Appl. No. 11/166,921, filed Jun. 23, 2005, Harrison et al.

Chen, L., et al., "Multiple Trusted Authorities in Identifier Based Cryptography from Pairings on Elliptic Curves," *Hewlett-Packard Technical Reports*, Internet: <http://www.hpl.hp.com/techreports/2003/HPL-2003-48.html> 27 pages total (Mar. 19, 2003).

ElGamal, T., "A Public Key Cryptosystem and a Signature Scheme Based on Discrete Logarithms," *IEEE Transactions on Information Theory*, vol. IT-31, No. 4, pp. 469-472 (Jul. 1985).

ISO/IEC FDIS 1488-2, Information Technology-Security Techniques-Digital Signatures with appendix- Part 2: Identity-based Mechanisms,: M. Chawrun, ed., 20 pages total (Oct. 6, 1998).

Mont, et al., "IBE applied to privacy and identity management," Hewlett-Packard (2003).

* cited by examiner

RSA CRYPTOGRAPHIC METHOD AND SYSTEM

FIELD OF THE INVENTION

The present invention relates to an RSA®cryptographic method and system; in particular, the present invention relates to an identifier-based RSA cryptographic method and system.

As is well known to persons skilled in the art, in "identifier-based" cryptographic methods the encryption key used to encrypt a message is based on a sender-chosen string and public data, the corresponding decryption key being computed, potentially subsequent to message encryption, using the sender-chosen string and private data associated with the public data. Frequently, the sender-chosen string serves to "identify" the intended message recipient and this has given rise to the use of the label "identifier-based" or "identity-based" generally for these cryptographic methods. However, depending on the application to which such a cryptographic method is put, the sender-chosen string may serve a different purpose to that of identifying the intended recipient and, indeed, may be an arbitrary string having no other purpose than to form the basis of the encryption key. Accordingly, the use of the term "identifier-based" herein in relation to cryptographic methods and systems is to be understood simply as implying that the encryption key is based on a sender-chosen, cryptographically unconstrained, string whether or not the string serves to identify the intended recipient, and that the corresponding decryption key can be subsequently computed from the string. Furthermore, as used herein the term "string" is simply intended to imply an ordered series of bits whether derived from a character string, a serialized image bit map, a digitized sound signal, or any other data source.

BACKGROUND OF THE INVENTION

Identifier-Based Encryption (IBE) is an emerging cryptographic schema. A number of IBE cryptographic methods are known, including:

- methods based on "Quadratic Residuosity" as described in the paper: "An identity based encryption scheme based on quadratic residues", C. Cocks, Proceedings of the 8$^{th}$ IMA International Conference on Cryptography and Coding, LNCS 2260, pp 360-363, Springer-Verlag, 2001;
- methods using Weil or Tate pairings—see, for example: D. Boneh, M. Franklin—"Identity-based Encryption from the Weil Pairing" in *Advances in Cryptology—CRYPTO* 2001, LNCS 2139, pp. 213-229, Springer-Verlag, 2001;
- methods based on mediated RSA as described in the paper "Identity based encryption using mediated RSA", D. Boneh, X. Ding and G. Tsudik, 3rd Workshop on Information Security Application, Jeju Island, Korea, August, 2002.

As the present invention also uses RSA cryptography, a description of the above-referenced identifier-based mediated RSA method is given below after a brief review of a basic RSA implementation and a mediated RSA arrangement.

Figure 1:
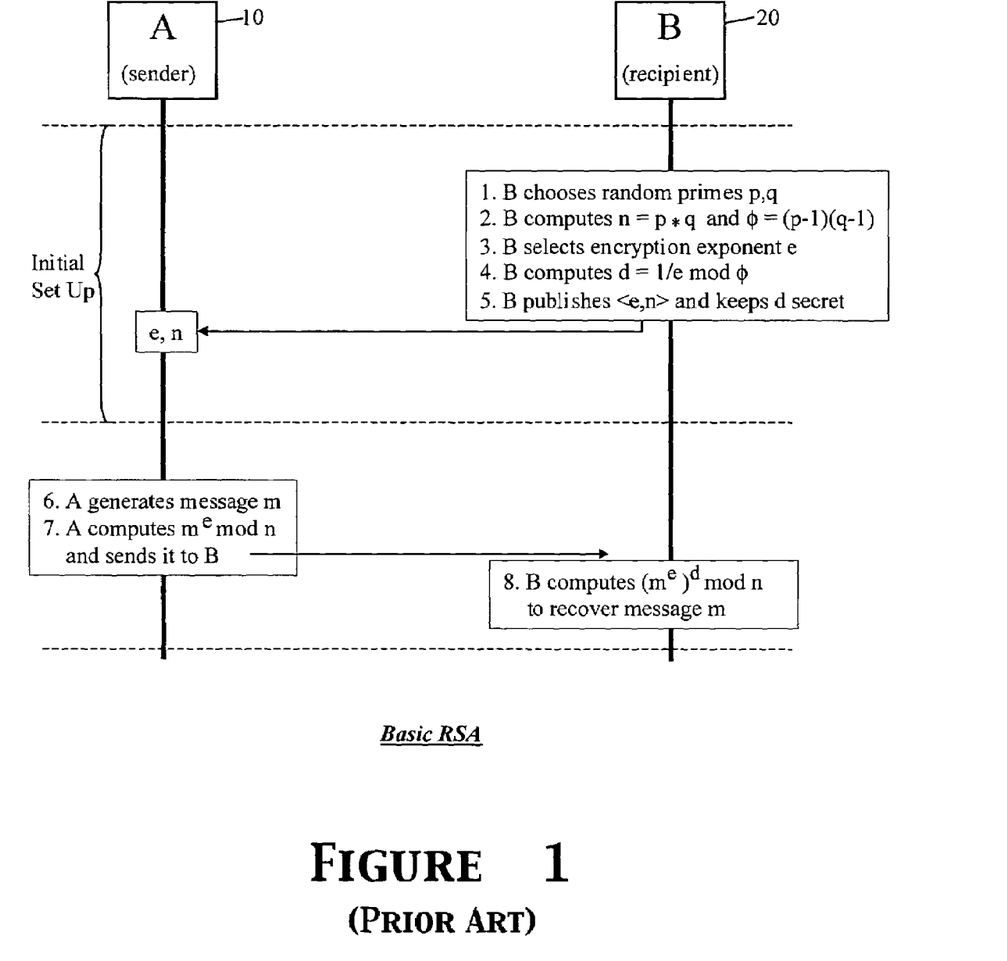
FIG. 1 is a diagram illustrating the operational steps of the well-known basic RSA cryptographic method.

The RSA public key cryptographic method is well known and in its basic form is a two-party method in which a first party generates a public/private key pair and a second party uses the first party's public key to encrypt messages for sending to the first party, the latter then using its private key to decrypt the messages. More particularly, and with reference to FIG. 1 of the accompanying drawings, in the basic RSA encryption method the following operational steps are carried out by a message sender A and a message recipient B acting through respective computing entities 10 and 20:

Initial Set Up Phase
1. B chooses distinct random primes p and q.
2. B computes n=(p).(q) and φ=(p−1).(q−1).
3. B selects an encryption exponent e such that e and φ have no common factors.
4. B computes a decryption exponent d=1/e mod φ
5. B publishes both e and n as its public key and keeps d secret as its private key (p and q are either destroyed or also kept secret)

Message Transfer Phase
6. A generates a message m.
7. A computes $m^e$ mod n and sends this to B.
8. B computes $(m^e)^d$ mod n to recover m.

The set up phase is carried out once whilst the message transfer phase is carried out for each message to be sent from A to B. In practice, the set up phase may be carried out on behalf of B by a certificate authority that provides a trustable certificate associating B to its public key <e,n> and communicates d securely to B; the value of e is fixed for any particular domain.

It is often required to provide for control of message sending from A to B using a particular key pair. For example, A and B may initially be members of the same organization with A sending messages to B using a public key for B that was certified or otherwise vouched for by the organization as being associated with B; however, should B leave the organization, it is desirable that the validity of B's public key be immediately revoked. One way of doing this is by the use of a revocation list that A must check each time it wants to send a message. A more reliable method is to use a mediated RSA method in which the decryption exponent d is split into two components, one held by B and the other held by a security mediator; in this case, both decryption exponent components must be applied to an encrypted message to decrypt it. This means that the security mediator must be contacted by B each time B wishes to decrypt a new encrypted message from A; the security mediator thus has control over which messages B decrypts and can therefore implement any desired control policy including, in the present example, preventing B decrypting messages after B has left the organization.

However, it will generally be undesirable for the security mediator to have the ability to fully decrypt messages sent to B which implies that the security mediator must not have knowledge of B's decryption exponent component (or the data needed to compute it). Therefore, the security mediator must be separate from the entity generating the two decryption exponent components; since this latter entity clearly cannot be B (as B would then not need to go to the security mediator to decrypt a message), a separate key generation entity is needed with the result that most mediated RSA methods are four-party methods.

Inherent positive features of mediated RSA methods are that the messages passing between B and the security mediator are encrypted, and that the intended recipient is the only recipient capable of reading a message even if the security mediator is misled as to the identity of the recipient passing it the message. An inherent drawback of mediated RSA methods is that, notwithstanding the separation of the KGC and the security mediator which should ensure that messages to B cannot be read by the security mediator, so far as B is concerned there is no real guarantee that the KGC and the security mediator are not collaborating to read B's messages.

Considering now the identifier-based mediated RSA method described in the above-referenced paper by Boneh, Ding and Tsudik, this differs from normal mediated RSA methods in that it is the encryption exponent e that is made recipient specific rather than the values of n and d. More particularly, each potential recipient B has an associated predetermined identifier string $ID_B$, such as an email address, that identifies the recipient. Thus, there exists a set of predetermined identifier strings $ID_B$ which by their nature are generally known to A and to the key generation center KGC. When A wishes to send a message to a particular recipient B, A chooses the relevant identifier string from the set of such strings and uses the chosen string to compute an encryption exponent. To effect its partial decrypt of the message, the security mediator SEM uses a decryption exponent component that the KGC has pre-computed for the recipient concerned using the known identifier string $ID_B$ of that recipient.

Figure 2:
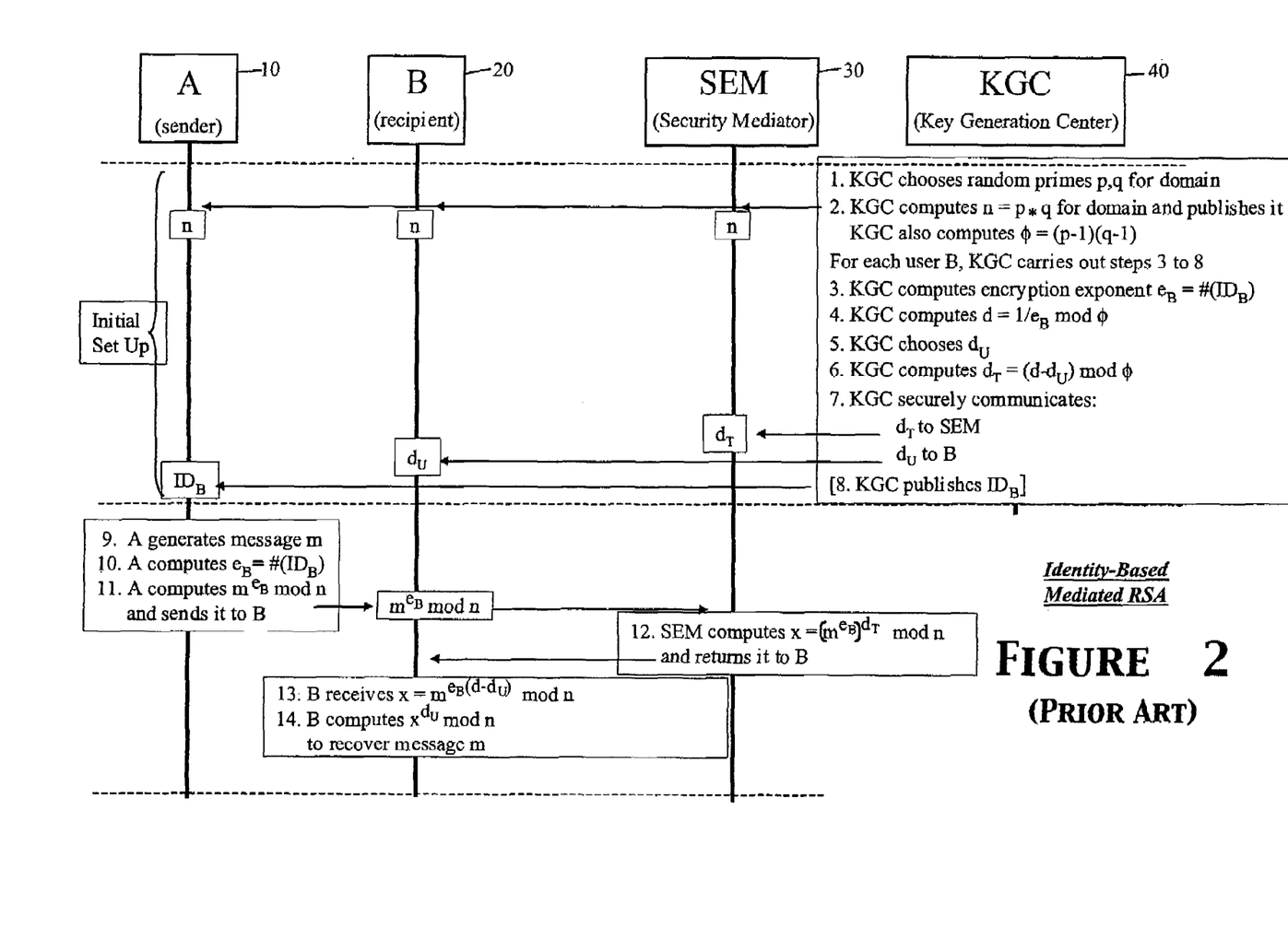
FIG. 2 is a diagram illustrating the operational steps of a prior art mediated RSA cryptographic method.

FIG. 2 of the accompanying drawings depicts in more detail the operational steps carried out in the identifier-based mediated RSA method, the parties involved being a message sender A, a message recipient B, a security mediator SEM and a key generation center KGC each acting through a respective computing entity 10, 20, 30 and 40. The operational steps involved are:

Initial Set Up Phase
1. KGC chooses distinct random primes p and q. The primes p and q are specific to a particular domain and are not recipient dependent.
2. KGC computes n=(p).(q) where n has a fixed value for the domain, this value being published in an appropriate certificate.
   The KGC also computes φ=(p−1).(q−1).
   For each B, the KGC carries out steps 3 to 8
3. KGC uses the identifier string $ID_B$ of the particular recipient B concerned to compute a recipient-specific encryption exponent $e_B$; the function used to compute $e_B$ is typically a hash function. The exponent e and the value φ should have no common factors.
4. KGC computes a recipient-specific decryption exponent d=1/$e_B$ mod φ.
5. KGC chooses $d_U$ (different for each B).
6. KGC computes a recipient-specific $d_T$=(d−$d_U$) mod φ.
7. KGC securely communicates $d_T$ to the security mediator SEM and $d_U$ to B.
8. KGC publishes $ID_B$ for B (only if not already known to message senders—where $ID_B$ is B's email address, it typically would not be re-published by the KGC).

Message Transfer Phase
9. A generates a message m.
10. A chooses the identifier string $ID_B$ of the intended recipient and computes the corresponding encryption exponent $e_B$ using the same function as used by the KGC (this function will have typically been incorporated in software provided to A's computing entity 10 for implementing the cryptographic method, but may be provided to A in any suitable manner including by distribution with n).
11. A computes $m^{e_B}$ mod n and sends this to B which forwards it to the security mediator SEM.
12. SEM computes x=$(m^{e_B})^{d_T}$ mod n and returns it to B.
13. B receives x which is equivalent to $(m^{e_B})^{(d-d_U)}$ mod n.
14. B computes $x^{d_U}$ mod n to recover the message m.

B's decryption exponent component $d_U$ can, of course, be generated by B, or jointly by the KGC and B, provided both know its value (in other words $d_U$ is a shared secret of B and the KGC). As with normal mediated RSA methods, unless the security mediator SEM only serves one recipient B, the security mediator will need to be provided with a recipient identifier in order to able to select which $d_T$ to use in step 11. This recipient identifier can be the $ID_B$ used by the sender and passed on by B or another identifier provided by B; as already indicated, it is not necessary for the security mediator to trust the recipient identifier—if the identifier does not identify the intended recipient of the message, then the message will not be even partially decrypted by application of the dT retrieved using the identifier.

Like normal mediated RSA methods, the identifier-based mediated RSA method of FIG. 2 must keep the key generation center KGC independent of the security mediator if the latter is not to have access to the messages. As a result, the identifier strings used by A must generally be predetermined strings for which the KGC has already determined the corresponding decryption exponent component $d_T$ to be used by the security mediator (the alternative of re-involving the KGC for each message to compute the $d_T$ for use by the security mediator is unattractive in practical terms).

It should also be noted that the same message m must never be encrypted using two different encryption exponents as this would compromise the security of the method. As a consequence, the basic message data must normally be combined with random padding to form the message m to be sent.

It is an object of the present invention to provide simplified identifier-based RSA cryptographic methods and systems.

SUMMARY OF THE INVENTION

According to one aspect of the present invention, there is provided an RSA-based cryptographic method comprising a step of:
(a) a sender encrypting a message using both a public modulus n, and an encryption exponent e that is a function of a string chosen by the sender, said function being of the form:

$e = z(2(\#(\text{sender-chosen string}))+1)$ where # is a hash function and z is an odd integer greater than or equal to 3; the public modulus n being the product of two distinct random primes:

$p=(2p'+1)$ $q=(2q'+1)$ where p' and q' are Sophie Germain primes;

step (a) being repeated for each new message with the same value of z being used each time for determining the encryption exponent e.

According to another aspect of the present invention, there is provided an identifier-based RSA cryptographic method comprising the steps of:
(a) a sender encrypting a message using both a public modulus n and an encryption exponent e that is a function of a condition string chosen by the sender which specifies one or more conditions to be checked by the trusted authority; the public modulus n being the product of two distinct random primes:

$p=(2p'+1)$ $q=(2q'+1)$ where p' and q' are Sophie Germain primes, and said function being such that e is odd and the values of e derived from different strings have a common divisor greater than one;

(b) a recipient receiving the encrypted message and subjecting it to a modulo-n blinding operation using a factor $r^e$ where r is a secret random number;

(c) making available the blinded encrypted message and the condition string to the trusted authority, the trusted authority using the condition string and private data comprising or derived from p and q, to compute a decryption exponent d which it then applies to the blinded encrypted message to produce a decrypted, though still blinded, version of said message that it returns to said recipient; this step (c) only being completed if the trusted authority is satisfied that said one or more conditions specified in the condition string are met; and (d) the recipient, on receiving the blinded decrypted message, cancelling the blinding to seek to recover the message.

It will be appreciated that, notwithstanding the involvement of a trusted authority in the message decryption process, the identifier-based RSA method set out above is not a mediated RSA method as the decryption exponent is not split into components held respectively by the recipient and the trusted authority.

Blinding itself is a known technique (see, for example, "Blind signatures for untraceable payments" in Advances in Cryptology—D. Chaum, Crypto '82, pp. 199-203, Springer-Verlag, 1983). However, the foregoing identifier-based RSA method is based in part on the insight that application of blinding by the message recipient does away with the need to split the decryption exponent in order to prevent the trusted authority from reading messages passed to it for decryption. A considerable simplification is therefore achieved as compared, for example, to the prior art identifier-based mediated RSA method depicted in FIG. 2.

In the encryption step the sender may have complete freedom regarding the string chosen or certain constraints may be placed on this choice.

The present invention also encompasses systems, apparatus and computer program products for implementing the foregoing methods.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 3:
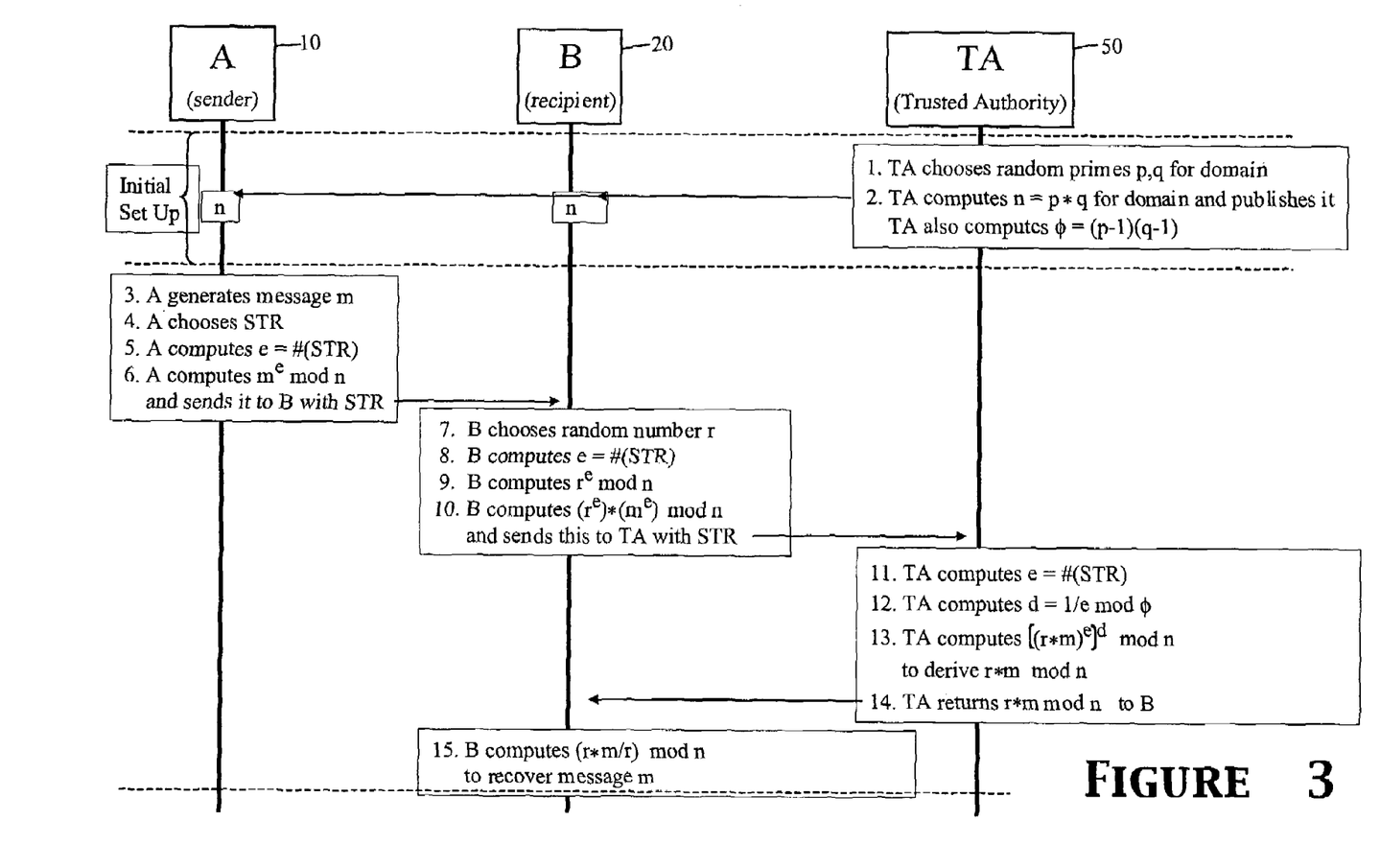
FIG. 3 is a diagram illustrating the operational steps of an identifier-based RSA cryptographic method embodying the invention.

FIG. 3 illustrates an identifier-based RSA cryptographic method and system embodying the invention and involving three parties, namely a message sender A acting through computing entity 10, a message receiver B acting through computing entity 20, and a trusted authority TA acting through computing entity 50. The computing entities 10, 20 and 50 are typically based around program-controlled processors though some or all of the cryptographic functions may be implemented in dedicated hardware. The entities 10, 20 and 50 inter-communicate, for example, via the internet or other computer network though it is also possible that two or all three entities actually reside on the same computing platform. For convenience, the following description is given in terms of the parties A, B and TA, it being understood that these parties act through their respective computing entities.

The FIG. 3 method and system permit the sender A to encrypt a message m using a string STR as the basis for the encryption key—this string may be any string subject to any restrictions imposed, for example, by a particular application or by the trusted authority. The sender A then sends the encrypted message and the string STR to a recipient B who blinds the encrypted message before forwarding it, together with the string STR, to the trusted authority TA for the latter to decrypt the message. Blinding the message prevents the trusted authority (or any third part eavesdropping on the communications between B and TA) from reading the message. The trusted authority returns the blinded, but now decrypted, message to B and B then cancels the blinding to retrieve the original message. A more detailed description of the operational steps involved in the foregoing process will now be given with reference to FIG. 3.

Initial Set Up Phase

1. TA chooses random primes p=2p'+1 and q=2q'+1 where both p' and q' are Sophie Germain primes. The primes p and q are specific to a particular domain or application or to the trusted authority and are not recipient dependent.

2. TA computes n=(p).(q) where n has a fixed value for the domain, this value being published (for example, in an appropriate certificate).

TA also computes $\phi=(p-1).(q-1)$.

Message Transfer Phase

Message Encryption by A

3. A generates a message m.

4. A chooses a string STR.

5. A applies a predetermined function to the string STR to compute a corresponding encryption exponent e; this predetermined function is typically a hash function and is arranged to ensure that the value of e is odd. The function used is also known to B and the trusted authority TA, typically having been distributed by the latter in any appropriate manner (such as by being incorporated in software provided to the computing entities 10 and 20 for implementing the cryptographic method, or by being distributed in the same certificate as n).

6. A computes $m^e$ mod n and sends this to B together with the string STR.

Message Blinding by B

7. B chooses a secret random number r using a cryptographically-strong random number generator.

8. B computes e from the string STR using the predetermined function.

9. B computes $r^e$ mod n.

10. B computes $(r^e).(m^e)$ mod n and sends this to the trusted authority together with the string STR.

Decryption by the Trusted Authority TA

11. TA computes e from the string STR using the predetermined function.

12. TA computes decryption exponent $d=1/e$ mod $\phi$.

13. TA computes $((r.m)^e)^d$ mod n thereby deriving r.m mod n

14 TA returns r.m mod n to B.

Cancellation of Blinding by B

15. B computes (r.m)/r mod n to recover the message m.

The above-described identifier-based RSA method ensures that the trusted authority cannot read the message m whilst guaranteeing its involvement in message decryption. In addition, any string STR can be used and the trusted authority is not required to store any data other than the values of p and q (and/or their derivatives n and φ).

In the FIG. 3 method and system, provided B has the encrypted message and the string STR, it can decrypt the message by using the services of the trusted authority TA—in particular, the message encryption is not such that only a particular recipient B can decrypt it. However, the trusted authority may (and in most applications, will) impose restrictions regarding for whom it is willing to carry out message decryption. For example, the trusted authority TA may only provide its decryption service to a defined group of recipients B (for example, members of a particular organization), the trusted authority requiring a recipient that presents a message to the TA for decryption to prove its membership of that defined group before the trusted authority decrypts a message. In fact, the trusted authority will often be provided by the message sender with conditions regarding which recipient(s) B are allowed to receive a particular message, these conditions being specified in the string STR used in the encryption of the message.

Whatever the source of the restrictions that the trusted authority is to apply, whenever the trusted authority receives a message from a particular recipient B for decryption, it will generally first determine whether any restriction applies; only if no restriction applies does the trusted authority carry out message decryption and return the blinded decrypted message to the recipient B concerned. Of course, the trusted authority could carry out message decryption immediately it receives any message for decryption, the check on whether any restriction applies being carried out in parallel or subsequent to decryption—if a restriction is found to apply, the TA simply does not provide the decrypted message to the recipient concerned.

As regards the string STR chosen by the sender, as already indicated, this string may be any string. The string can be based on a character string, a serialised image bit map, a digitised sound, or any other data such as data input by the sender using an input device. However, in many cases restrictions will be placed on the strings selectable by the sender. For example, the sender may be required to select a string from a set of predetermined strings provided by the trusted authority or by another party; alternatively, the string may be required to conform to a predetermined set of rules with regard to its formatting and/or content (e.g. the string STR may be required to comply with a particular XML schema).

Generally (though not necessarily), the string STR is used to convey to the trusted authority information concerning actions to be taken by the trusted authority when it receives the encrypted message for decryption. If a recipient changes the information in the string before passing it to the trusted authority, the string will no longer be usable to compute the correct decryption exponent d in steps 11 and 12 of FIG. 3.

The information in the string STR may relate to actions to be taken by the trusted authority that do not affect message decryption—for example, the trusted authority TA may be required to send a message to the message sender A at the time the TA decrypts the message concerned. However, the information in the string STR will frequently specify one or more conditions to be checked by the trusted authority as being satisfied before the trusted authority decrypts the related encrypted message (or before returning the corresponding decrypted message to the recipient B concerned).

For example, the string STR may comprise a recipient identity condition identifying a specific intended message recipient; in this case, the trusted authority carries out an authentication process with the recipient B presenting the related message for decryption to check that the recipient concerned meets the recipient-identity condition.

Rather than identifying an intended recipient as a particular individual, the string STR may comprise one or more conditions specifying one or more non-identity attributes that the recipient must possess; for example, a condition may specify that a recipient must have a certain credit rating. Again, it is the responsibility of the trusted authority to check out this condition before producing the decrypted message for a recipient presenting the encrypted message for decryption.

The string STR may additionally or alternatively comprise one or more conditions unrelated to an attribute of the intended recipient; for example, a condition may be included that the message concerned is not to be decrypted before a particular date or time.

Whatever the conditions relate to, the string STR may directly set out the or each condition or may comprises one or more condition identifiers specifying corresponding predetermined condition known to the trusted authority (in the latter case, the trusted authority uses the or each condition identifier to look up the corresponding condition to be checked).

With respect to the form of the blinding applied by the recipient B, in the FIG. 3 embodiment this involved a modulo-n multiplication of the encrypted message by $r^e$, the blinding being subsequently cancelled by a modulo-n division of the blinded decrypted message by r. It will be appreciated by persons skilled in the art that the factor $r^e$ mod n can be applied in other ways to blind the encrypted message. For example, the blinding operation can comprise a modulo-n multiplication of the encrypted message by $r^{-e}$ with the blinding being subsequently cancelled by a modulo-n multiplication of the blinded decrypted message by r. The blinding operation and its subsequent cancellation ares totally transparent to the trusted authority.

In the FIG. 3 embodiment, the value of the public modulus n and of the corresponding private data p,q (or φ) held by the trusted authority was assumed to be fixed for the domain/application/trusted-authority concerned. However, it is possible for multiple different values of the modulus n and the corresponding private data to be in use together. For example, there may be multiple groups of recipients each of which has associated value of n and of the corresponding private data. In the extreme, each recipient B has its own associated values of n and p,q (or φ). Of course, where there are multiple values of n and p,q (or φ) in use, the trusted authority needs to be provided with an indication of the values to be used for any particular message; for example, a group or recipient indicator can be included in the string STR or provided by the recipient B presenting the encrypted message for decryption.

In certain situations it may be required that a message should only be decryptable with the cooperation of multiple trusted authorities each of which would typically have a different associated public modulus n and private data. One such situation where this may be desirable is where the sender wishes to impose multiple conditions but no single trusted authority is competent to check all conditions—in this case, different trusted authorities can be used to check different conditions. Another situation in which multiple trusted authorities may be required is where there is a concern that a trust authority may have access to the encrypted, but not blinded, messages passing from A to B and it is important to prevent the trust authority reading the messages—in this case, multiple trusted authorities can be used together in a manner such that no one authority can read the messages passing from A to B.

Various arrangements are possible for involving multiple trusted authorities, including:

the sender organizes the message content as a number of data sets (say k data sets) by using Shamir's secret sharing scheme and then encrypts each data set using an associated string STR (for example, specifying a respective condition to be checked) and the public modulus of a respective one of the trusted authorities; in order to retrieve the message, a recipient B has to go to all of the trusted authorities in order to decrypt all of the data sets because any k−1 data sets or less cannot disclose any of the message contents.

the sender can use the encrypted data resulting from encrypting message data using a first string (for example, specifying a particular condition) and the public modulus of a first trusted authority as the data to be encrypted using a second string and the public modulus of a second trusted authority and so on; the encrypted data resulting from the encryption effected in respect of all trusted authorities to be used then being sent to the recipient B for decryption in successive decryption operations by the corresponding trusted authorities.

As is well known, in RSA methods the encryption exponent e must have no common factors with $\phi$. This can be checked by the trusted authority where e is known in advance to the trusted authority; this would be the case, for example, for embodiments of the invention where e is based on a string chosen from a set of predetermined strings. However, for embodiments where the encryption exponent e is based on a string created by the sender, the trusted authority will not know e in advance of its use. In order to meet the requirement that the encryption exponent e have no common factors with $\phi$, where the trusted authority does not know e in advance, the following constraints, already noted above in relation to the FIG. 3 embodiment, can be imposed, namely:

the function F used to generate the encryption exponent is such that e is always odd; and $p=(2p'+1)$ and $q=(2q'+1)$ where p' and q' are Sophie Germain primes.

These constraints together serve to ensure, with a very high probability, that the encryption exponent e and $\phi$ will have no common factors.

Whilst the above-described embodiment and its variants are adequate in some environments, for most environments certain constraints need to be applied to remove its vulnerability to a number of attacks.

Common Modulus Attack: With RSA methods it is accepted that one should never encrypt the same message multiple times with different exponents that are coprime, since an attacker could then use the Extended Euclidean Algorithm to recover the original message. Various solutions are available:

Use random padding of the message to ensure that the same message is never encrypted twice. The basic message content is thus combined with random padding and a message-content length indicator to form the message m to be encrypted.

Ensure that the same message content is never re-sent—whilst this is possible to do in theory (for example, by storing all sent messages and checking any new message against the stored messages) in reality this solution is only practical in limited situations.

Ensure that the exponents are never coprime (that is, values of e derived from different strings having a common divisor greater than one). This can be achieved, for example, by making all exponents a multiple of 3; thus e can be derived from the string STR using a hash function # for which #(STR)≡ 3 mod 6—in other words:

$e=3(2(\#(STR))+1)$.

More generally, successive values of e can be:

$e=z(2(\#(STR))+1)$ where z is an odd integer $\geq 3$, this value being fixed (that is, for each new message to be encrypted, the same value of z is used in the calculation of the encryption exponent e). The hash function is chosen such that the e is large (generally >>1024) and preferably lies within the range 1 to ($\phi$1).

Traffic Analysis: If the same encrypted message is seen twice, then it is likely that it is the same message being encrypted with the same key and transmitted. This gives information to the attacker. The cure is to use random padding as described above.

Active Attacker: In the FIG. 3 embodiment, B passes $(r.m)^e$ mod n to the trusted authority. A third party intercepting this message could compute:

$(newm^e/m^e).(r.m)^e$ mod $n=(r.newm^e)$ mod $n$ thus changing the message m to newm. The channel between B and TA should therefore be able to detect any attempt to modify the message.

Another point to note regarding reducing vulnerability from cryptographic attacks is that the size of the message should, preferably, be similar to the value of the modulus n and this can be achieved by always adding an appropriate amount of random padding to the message content. Thus, for example, where the "message" is, in fact, a symmetric cryptographic key for encoding/decoding subsequent exchanges, the message can be padded by any suitable padding scheme such as OAEP (M. Bellare and P. Rogaway. Optimal Asymmetric Encryption—How to Encrypt with RSA. In Advances in Cryptology-Eurocrypt '94, pp. 92-111, Springer-Verlag, 1994).

It will be appreciated that the function used to derive values of the encryption exponent e from the sender-chosen string can be used in RSA-based cryptographic methods that do not involve the use of blinding to hide a message from a decrypting trusted authority.

The invention claimed is:

1. An RSA cryptographic method comprising a step of:
(a) a sender encrypting a message using both a public modulus n, and an encryption exponent e that is a function of a string chosen by the sender, said function being of the form:

$e=z(2(\#(\text{sender-chosen string}))+1)$ where # is a hash function and z is an odd integer greater than or equal to 3; the public modulus n being the product of two distinct random primes:

$p=(2p'+1)$ $q=(2q'+1)$ where p' and q' are Sophie Germain primes;

step (a) being repeated for each new message with the same value of z being used each time for determining the encryption exponent e.

2. A method according to claim 1, further comprising, for each encrypted message, steps of:
(b) a recipient receiving the encrypted message and subjecting it to a modulo-n blinding operation using a factor $r^e$ where r is a secret random number;
(c) making available the blinded encrypted message and said string to a trusted authority which uses said string and private data used to derive said public modulus n, to compute a decryption exponent d, the trusted authority then applying this decryption exponent d to the blinded encrypted message to produce a decrypted, though still blinded, version of said message that it returns to said recipient; and
(d) the recipient, on receiving the blinded decrypted message, cancelling the blinding to recover the message.

3. A cryptographic method according to claim 2, wherein the string chosen by the sender in step (a) comprises information concerning actions to be taken by the trusted authority, the trusted authority using the information in the string to carry out corresponding actions.

4. A cryptographic method according to claim 3, wherein said information specifies one or more conditions to be checked by the trusted authority, step (c) including the trusted authority checking said one or more conditions and only completing step (c) if satisfied that said one or more conditions are met.

5. A cryptographic method according to claim 4, wherein said one or more conditions comprise a recipient identity condition, the trusted authority carrying out an authentication process with said recipient to check that the latter meets the recipient-identity condition.

6. A cryptographic method according to claim 4, wherein said one or more conditions comprise at least one condition specifying a non-identity attribute that the recipient must possess.

7. A cryptographic method according to claim 4, wherein said one or more conditions comprise at least one condition unrelated to an attribute of the intended recipient.

8. A cryptographic method according to claim 7, wherein said at least one condition unrelated to an attribute of the intended recipient, is a time or date related condition.

9. A cryptographic method according to claim 2, wherein the blinded encrypted message is passed from the recipient to the trusted authority over a channel arranged to detect any modification of the blinded encrypted message.

10. A cryptographic method according to claim 2, wherein:
in step (b) the blinding operation comprises a modulo-n multiplication of the encrypted message by $r^e$; and
in step (d) the blinding is cancelled by a modulo-n division of the blinded decrypted message by r.

11. A cryptographic method according claim 2, wherein:
in step (b) the blinding operation comprises a modulo-n multiplication of the encrypted message by $r^{-e}$; and
in step (d) the blinding is cancelled by a modulo-n multiplication of the blinded decrypted message by r.

12. A cryptographic method according to claim 2, wherein different groups of potential recipients have associated different respective values of the public modulus n and of said private data; the trusted authority using in step (c) the value of n and of the corresponding private data, associated with a said group identified to the trusted authority either in the string or in an identifier passed to it by the recipient presenting a said message for decryption to the trusted authority.

13. A cryptographic method according to claim 2, wherein each of multiple potential recipients has associated different respective values of the public modulus n and of said private data; the trusted authority using in step (c) the value of n, and the corresponding private data, associated with a said recipient identified to the trusted authority either in the string or in an identifier passed to it by the recipient presenting a said message for decryption to the trusted authority.

14. A cryptographic method according to claim 1, wherein the public modulus n is specific to a particular trusted authority.

15. A cryptographic method according to claim 1, wherein different groups of potential recipients have associated different respective values of the public modulus n, the sender choosing the value of the public modulus used in dependence on the group to which the intended recipient of the message belongs.

16. An identifier-based RSA cryptographic method comprising the steps of:
(a) a sender encrypting a message using both a public modulus n and an encryption exponent e that is a function of a condition string chosen by the sender which specifies one or more conditions to be checked by a trusted authority; the public modulus n being the product of two distinct random primes:

$p=(2p'+1)$ $q=(2q'+1)$ where p' and q' are Sophie Germain primes, and said function being such that e is odd and the values of e derived from different strings have a common divisor greater than one;
(b) a recipient receiving the encrypted message and subjecting it to a modulo-n blinding operation using a factor $r^e$ where r is a secret random number;
(c) making available the blinded encrypted message and the condition string to the trusted authority, the trusted authority using the condition string and private data comprising or derived from p and q, to compute a decryption exponent d which it then applies to the blinded encrypted message to produce a decrypted, though still blinded, version of said message that it returns to said recipient; this step (c) only being completed if the trusted authority is satisfied that said one or more conditions specified in the condition string are met; and
(d) the recipient, on receiving the blinded decrypted message, cancelling the blinding to seek to recover the message.

17. A cryptographic method according to claim 16, wherein said function comprises a hash function and gives a value for said encryption exponent that is a multiple of 3.

18. A cryptographic method according to claim 16, wherein said function is a hash function where hash (condition string)≡3 mod 6.

19. Encryption apparatus comprising:
a first processing circuit for generating an encryption exponent e from a sender-chosen string according to a function of the form:

$e=z(2(\#(\text{sender-chosen string}))+1)$ where # is a hash function and z is an odd, fixed-value, integer greater than or equal to 3; and
a second processing circuit for effecting RSA-based encryption of a message using the encryption exponent e and a public modulus n that is the product of two distinct random primes:

$p=(2p'+1)$ $q=(2q'+1)$ where p' and q' are Sophie Germain primes.

20. A cryptographic system comprising:

encryption apparatus according to claim 19;

a recipient computing entity comprising:
- a first processing arrangement for receiving the encrypted message and subjecting it to a modulo-n blinding operation using a factor $r^e$ where r is a secret random number, and
- a second processing arrangement for receiving a blinded decrypted version of said message and cancelling the blinding to recover said message;

a trusted-authority computing entity for receiving the blinded encrypted message and said string and comprising:
- a first processing arrangement for using said string and private data used to derive said public modulus n, to compute a decryption exponent d, and
- a second arrangement for applying the decryption exponent d to the blinded encrypted message to produce a decrypted, though still blinded, version of said message for return to said recipient computing entity.

* * * * *